Feb. 14, 1956  S. KLEINHANS  2,734,356
CABIN SUPERCHARGING SYSTEM WITH COOLING MEANS
Filed May 23, 1952
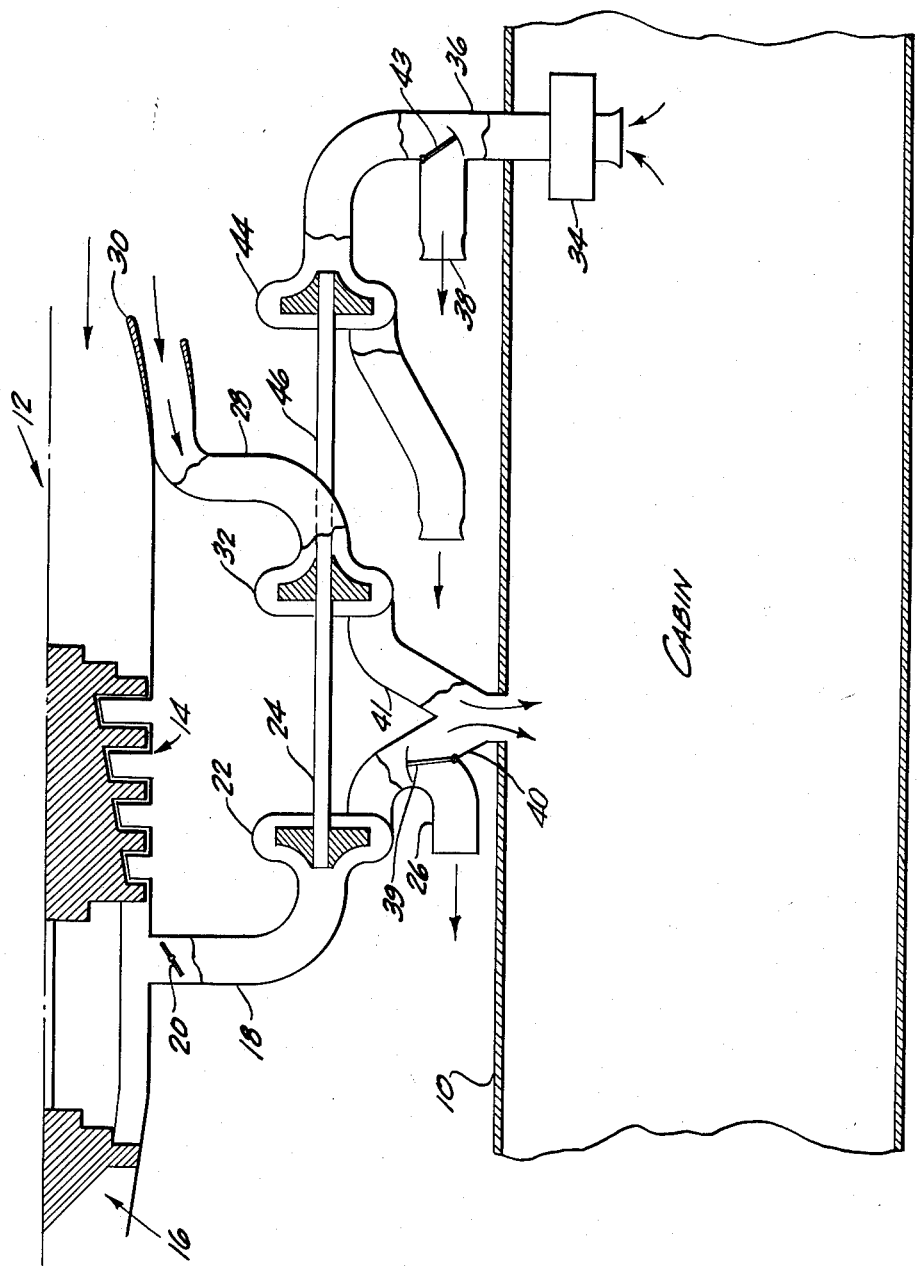
INVENTOR.
SCHUYLER KLEINHANS
BY
Edwin Coates
ATTORNEY.

United States Patent Office 2,734,356
Patented Feb. 14, 1956

2,734,356
CABIN SUPERCHARGING SYSTEM WITH COOLING MEANS

Schuyler Kleinhans, Santa Monica, Calif., assignor to Douglas Aircraft Company, Inc., Santa Monica, Calif.

Application May 23, 1952, Serial No. 289,695

5 Claims. (Cl. 62—136)

This invention relates to cabin supercharging systems and more particularly to a system which is peculiarly adapted for use in aircraft propelled by a turbo-compressor type installation.

Since the advent of the jet and turbo-prop type aircraft the number of uses for compressed air in an aircraft craft has been greatly increased, since the planes are powered by a turbine-compressor combination which provides a readily available source of air under rather high pressures. This has led designers to constantly bleed more and more compressed air from the turbo-compressor installation in order to operate numerous accessories such as pressurizing apparatus, de-icing systems, and so on. Such high pressure air is not free and must be paid for by what, in many cases, amounts to a large decrease in propulsive power.

In the past it has been common practice to bleed sufficient compressed air from the compressor unit of the power installation to supply the required mass-flow of air in the interior of the aircraft in order to pressurize and condition the same for flight at high altitude under widely varying temperature conditions. This practice requires a large drop in the kinetic energy of the high pressure air bled from the compressor unit in order to lower the pressure and temperature to that required in the interior of the aircraft. The common practice has been to take up this energy by passing the high pressure air through a turbine or other expansion means, thereby lowering the pressure and temperature of the air to the required levels. The kinetic energy of the gas molecules is thus converted to kinetic energy in the form of turbine blade rotation. This energy is often disposed of by operating accessories such as fans which aid in circulating air in various portions of the aircraft or by operating motors or other accessories. This excess energy is not desired since it represents a drop in propulsive power of the turbo-compressor installation. Since past practice has required this diversion of energy from its primary use it has been used to operate numerous accessories in order to avoid a complete waste of energy.

The present invention eliminates the necessity for impairing the propulsive power of the turbo-jet installation by eliminating the need to bleed high temperature air from the power installation in masses equal to that required to pressurize and otherwise condition the interior of the aircraft. Basically the system is designed to operate by bleeding only that mass of high pressure high temperature air from the compressor unit which is necessary to obtain sufficient energy conversion to enable the turbine to operate a compressor. The latter receives the main or primary conditioning air from a separate "free" source such as a ram air inlet. This compressor is then used to supply the pressurized air requirements of the aircraft interior either alone or in conjunction with the bleed air which has passed through the turbine. The exhaust from the turbine may be ducted overboard if it is desired to obtain a greater pressure drop and therefore a greater amount of energy per pound of air bled from the compressor unit. Additional energy for operating the compressor may also be obtained by passing the air exhausted from the interior of the aircraft through a second turbine in order to take advantage of the pressure differential existing between the cabin air and the ambient air. In all forms the primary objective is to take only that amount of compressor unit air from the power installation which will supply the required energy to pressurize the cabin. This energy then operates an additional compressor which receives air from a source other than said compressor unit in order to meet or aid in meeting the pounds of airflow requirements of the aircraft interior.

Other features and advantages of the present invention will be apparent from the following description taken in connection with the accompanying drawing in which the singe figure schematically illustrates the cabin supercharging system of the present invention including means to vary the duct arrangements.

Referring now to the figure, a supercharging system is shown which serves, in this instance, to pressurize the interior of that portion of an aircraft fuselage 10 which contains the cabin. A turbo-compressor power installation 12 of either the turbo-prop or turbo-jet type is shown, in this instance, in a position indicating that it is mounted in the wing, not shown, which connects to the fuselage. The power installation 12 is provided with the customary single or multi-stage compressor unit 14 and turbine unit 16.

In this case a duct 18 is shown in a position to bleed compressed air from the last stage of the compressor unit, although it is readily apparent that, when expedient, lower pressure air can be selected by connecting the duct to some intermediate stage. The amount of air bled from the power installation 12 and consequently the amount of energy diverted is regulated in accordance with interior pressurization requirements by any of numerous standard air conditioning regulation systems, not shown. Among other functions the regulating systems control the pass flow of air from the power installation by actuating such well known means as the butterfly valve 20.

The duct 18 directs the high pressure air flow through expansion means of the type which will lower the pressure of the air to that necessary to enable the system to hold the interior to be pressurized at the desired pressure level and simultaneously efficiently convert the drop in kinetic energy of the molecules of air to other forms of kinetic energy. In this case the expansion means is shown as a turbine 22 which applies the converted energy to power transmitting means such as shaft 24 and exhausts the cooled air at a lower pressure into duct 26 which is shown carrying the air overboard into the ambient air.

A ram or ambient air inlet duct 28 receives ambient air from some convenient location such as a point adjacent the ram air port 30 of the power installation 12. The purpose of this duct is to draw air from some relatively free source, such as ambient air, in order to direct air through a compressor 32. The compressor is operated by the energy, taken from the high energy air bled from the compressor unit 14, which is transmitted by shaft 24 as previously explained. The compressor serves to increase the pressure of the air taken from the second or free source to a level which will supply air to the interior areas of the aircraft at the required pressure, temperature, and rate.

In order to complete one form of the system it is necessary only to add one or more of several standard types of cabin pressure regulators 34 which control the interior pressure by regulating the amount of air exhausted from the aircraft by way of duct 36. In the simplest form, the exhaust air is simply passed overboard as indicated at 38.

The apparatus thus far described serves to carry out a process which substantially reduces the amount of high pressure air that must be bled from the compressor unit of the power installation. This is done by limiting the pound flow of air bled from the compressor unit 14 to a quantity which will provide only that amount of energy required to enable the compressor 32 to meet the pressurization and other air conditioning requirements of the interior of the aircraft. Thus, in the form now referred to, a drop in kinetic energy from the pressure at the entrance to the turbine 22 to the exit of the duct 26 which exhausts to the atmosphere is sufficient, upon conversion by said turbine to kinetic energy, to operate the compressor 32 in a manner which permits it to meet the supercharging requirements of the interior of the aircraft. It is therefore apparent that the compressor unit 14 is no longer required to supply the entire mass flow of air required by the cabin. The high energy air available at this source is thus used in the most efficient manner, thereby greatly reducing the energy loss suffered by the power installation to an amount considerably lower than has been the case with previous systems as has already been explained.

Under some circumstances it is preferable to direct the exhaust air from the expansion turbine means into the cabin or other interior area rather than overboard. Such an arrangement makes it possible to utilize all converted kinetic energy from the compressor unit bleed air for the sole purpose of supercharging the cabin. This is accomplished by the provision of the interconnecting conduit 40 from duct 26 to duct 41. Valve 39 may be adjusted to direct air out of duct 26 or through conduit 40 to duct 41. It can be adjusted to intermediate positions in order to control the proportions of air mixed and to regulate air temperature. However, it is desirable that primary air flow regulation occur by actuation of such means as the butterfly valve 20 and that the mixing valve should not operate to impede the flow of air from the compressor 32 since this would mean that not all the available energy of the bleed air would be utilized.

Other embodiments may easily be developed once the basically novel features of the system are known and applied. For instance, referring again to the figure, by adjusting valve 43 to the vertical position, closing off exit duct 38, the cabin or interior exhaust duct 36 may serve to direct the interior exhaust air through a second turbine 44 or other work extracting expansion means. In such an application the energy available by reason of the differential pressure of the interior of the aircraft over the ambient atmosphere is likewise converted into a useful form of kinetic energy. This energy is applied to power transmission means such as the second shaft 46 which is operatively connected to the compressor means 32 and thereby aids the first turbine 22 in operating said compressor. Again, it is apparent that such use of the kinetic energy of the exhaust air can be made regardless of the particular choice made as to the arrangement of the exhaust duct 26 of the first turbine 22.

It is also possible to utilize the basic features of the present invention in supercharging systems employing a plurality of turbines or compressors in order to increase the capacity of the system. The adaptability of the supercharging system here disclosed is more readily comprehended once it is realized that the system permits the bleed from the power installation to be limited to an amount which provides only enough energy to supercharge the cabin and that no more air need be bled even though the mass of high temperature air making the necessary energy available is substantially less than the mass required to satisfactorily supercharge the interior of the aircraft. In the past the practice has necessarily been to bleed enough pounds of air from the turbo-compressor installation to supply the required pounds of air to be used in supercharging the aircraft interior. With the present system this limitation is no longer present. Hence the amount of air bled can be determined on the more desirable and economical basis of filling only the supercharging system energy requirements as opposed to a determination based on the need to bleed enough pounds of air to meet the requirements of the same system from the pounds of air circulated standpoint.

Although the now preferred embodiments and methods of the present invention have been illustrated and described it is to be understood that the invention need not be limited thereto for it is susceptible to changes in form, detail and application within the scope of the appended claims.

I claim:

1. Apparatus for pressurizing the interior of a turbo-compressor powered aircraft, comprising: a turbo-compressor power unit; expansion turbine means; duct means for directing high pressure air from the compressor of said power unit to said expansion turbine means; compressor means; second duct means for directing air from a source other than said turbo-compressor power unit to said compressor means; third duct means for directing the cooled, expanded air from said turbine means and the compressed air from said last mentioned compressor means to the interior of said aircraft; power transmitting means connecting said turbine means to said last mentioned compressor means to enable the latter to be operated by the work energy developed during the expansion of said high pressure air; and regulating means for limiting the amount of high pressure air bled from said power unit for pressurization purposes to an amount not substantially greater than that necessary to release sufficient work energy to enable the combined output of said turbine means and said last mentioned compressor means to meet the compressed air requirements of the interior of said aircraft.

2. Apparatus for pressurizing the interior of a turbo-compressor powered aircraft, comprising: a turbo-compressor power unit; expansion turbine means; duct means for directing high pressure air from the compressor of said power unit to said expansion turbine means; compressor means; second duct means for directing air from a source other than said turbo-compressor power unit to said compressor means; third duct means for directing the cooled, expanded air from said turbine means and the compressed air from said last mentioned compressor means to the interior of said aircraft; power transmitting means connecting said turbine means to said last mentioned compressor means to enable the latter to be operated by the work energy developed during the expansion of said high pressure air; exhaust duct means leading from the interior of said aircraft to the ambient atmosphere; second expansion turbine means disposed in said exhaust duct means to receive the exhaust air from the interior of said aircraft; second power transmitting means connecting said second turbine means to said last mentioned compressor means to aid in the operation of said compressor; and regulating means for limiting the amount of high pressure air bled from said power unit for pressurization purposes to an amount not substantially greater than that necessary to release sufficient work energy to enable the combined output of said turbine means and said last mentioned compressor means to meet the compressed air requirements of the interior of said aircraft.

3. Apparatus for pressurizing the interior of an aircraft having a source of high pressure air comprising: rotatable energy-transfer means; duct means for directing high pressure air from said source to said energy-transfer means; second duct means for directing air from a source other than said high pressure source to the interior of said aircraft; compressor means disposed in said second duct means to receive and compress air from said other source; third duct means interconnecting with and cooperating with said second duct means to form a mixing chamber for air received from said energy transfer means and said compressor means and to conduct the resultant tempered air mixture to the interior of said aircraft; and power transmitting means connecting said energy transfer means to said compressor means to enable the latter to be operated by the energy extracted from said high pressure air in said energy transfer means.

4. Apparatus as claimed in claim 3 and, in addition thereto; regulating means for limiting the amount of high pressure air delivered from said high pressure source to an amount not substantially greater than that necessary to release sufficient work energy to enable said compressor means to meet the compressed air requirements of the interior of said aircraft.

5. Apparatus as claimed in claim 3 and, in addition thereto, regulating means to vary the relative proportions of air passing into said mixing chamber from said first and second ducts to thereby control the temperature of the air entering into the interior of said aircraft.

References Cited in the file of this patent

UNITED STATES PATENTS

| | | |
|---|---|---|
| 2,374,708 | Shoults | May 1, 1945 |
| 2,391,838 | Kleinhans | Dec. 25, 1945 |
| 2,479,991 | Wood | Aug. 23, 1949 |
| 2,509,899 | Wood | May 30, 1950 |
| 2,557,099 | Green | June 19, 1951 |
| 2,582,848 | Price | Jan. 15, 1952 |